United States Patent [19]

Bracke et al.

[11] 3,992,484

[45] Nov. 16, 1976

[54] PROCESS FOR PREPARING HIGH-IMPACT VINYL AROMATIC POLYMERS

[75] Inventors: William J. I. Bracke, Hamme; Bernard M. J. Haveaux, Nivelles, both of Belgium

[73] Assignee: Labofina S. A., Brussels, Belgium

[22] Filed: June 30, 1975

[21] Appl. No.: 591,481

[52] U.S. Cl. ............................................. 260/880 R
[51] Int. Cl.² ......................................... C08L 9/08
[58] Field of Search ................................ 260/880 R

[56] References Cited
UNITED STATES PATENTS

| | | | |
|---|---|---|---|
| 3,373,227 | 3/1968 | Finestone | 260/880 R |
| 3,644,587 | 2/1972 | Finberg | 260/880 R |
| 3,781,383 | 12/1973 | Finestone | 260/880 R |
| 3,781,384 | 12/1973 | Finestone | 260/880 R |

OTHER PUBLICATIONS

Schwartz, "Surface Active Agents", vol. 1, 1949, Interscience Pub., New York, pp. 77–79.

Kirk–Othmer, "Encyclopedia of Chemical Technology," vol. 19, 2nd Ed., 1969, Interscience, New York, pp 527–529.

*Primary Examiner*—Paul R. Michl

[57] ABSTRACT

Disclosed is a process for the preparation of high-impact vinyl aromatic polymers by mass pre-polymerizing a vinyl aromatic hydrocarbon in the presence of a rubber, and suspension polymerizing the mass pre-polymer in the presence of hydroxyapatite and at least one ethoxysulphate of the formula $RO(C_2H_4O)_x SO_3M$, wherein R is an alkyl radical containing from 10 to 16 carbon atoms, $x$ is from 2 to 6, and M is Na, K, N, $NH_4$, an amine group, or an alkanol amine group.

10 Claims, No Drawings

PROCESS FOR PREPARING HIGH-IMPACT VINYL AROMATIC POLYMERS

BACKGROUND OF THE INVENTION

This invention relates to the preparation of high-impact vinyl aromatic polymers, and more particularly to an improved two-step polymerization process for the preparation of vinyl aromatic polymer in bead form.

It is known that the impact resistance of vinyl aromatic polymers is improved by modification with a rubber, generally present in particulate form.

When a vinyl aromatic compound is polymerized in the presence of a rubber, the resulting compositions consist of said rubber and a vinyl aromatic polymer, a part of the latter being grafted on the rubber.

Procedures for producing the high-impact vinyl aromatic polymers require specific conditions for the pre-polymerization, copolymerization, or graft polymerization of the vinyl aromatic compound and rubber compound.

Known polymerization processes such as emulsion-, suspension-, or mass-polymerization may be used to prepare these polymeric compositions. A two-step process is often used. Such method involves first forming a mass polymer by pre-polymerizing a vinyl aromatic compound in the presence of a rubber and then suspending the mass to complete the grafting as a suspension. The polymeric composition is thus obtained in the form of beads which are easily separated from the reaction mixture and then washed and dried.

In the suspension polymerization step, the pre-polymerization mixture is suspended in an aqueous solution containing essentially a suspending agent and a wetting agent.

However, producing a stable aqueous suspension of the mass prepolymer is a critical operation. The stability of the suspension depends upon the amount and type of suspending agent, on the amount and type of wetting agent, on the size of the reactor, and on other factors. It has been observed more particularly that the amount of wetting agent must be kept between narrow limits and that these limits depend upon many factors. For instance, a suspension method which is suitable for one reactor cannot be applied in another larger reactor; in some cases, a suspension cannot be obtained and, in other cases, the polymeric composition forms beads which are too large and worked with difficulty.

SUMMARY OF THE INVENTION

In accordance with this invention, it has now been found that high-impact vinyl aromatic polymers are produced in an improved polymerization process for easily obtaining small polymer beads, by suspension-polymerizing a rubber-modified, mass pre-polymerized vinyl aromatic compound in the presence of a suspending agent and a specific type of wetting agent. More particularly, the invention provides stable suspensions under varying working conditions, and enables the manufacture of small-bead, high-impact vinyl aromatic polymers.

Therefore, an object of the present invention is to provide a new and improved two-step process for producing high-impact vinyl aromatic polymers. Another object of this invention is to provide a process for the manufacture of small beads of high-impact vinyl aromatic polymers. It is also an object of this invention to provide a process reducing the disadvantage resulting from low variations in the amount of wetting agent present during the suspension step.

Other aspects, objects, and the several advantages of this invention will be readily apparent to those skilled in the art from the description and appended claims.

The process of the present invention comprises:

a. a mass pre-polymerization of a vinyl hydrocarbon in the presence of a rubber, which is present in an amount of from 2 to 30% based on the total weight of monomer, about 5 to 40% of the monomer being polymerized, b. and then a suspension-polymerization in the presence of hydroxyapatite suspending agent, and of at least one ethoxysulphate wetting agent of formula RO $(C_2H_4O)_x SO_3M$, where R is an alkyl radical containing from 10 to 16 carbon atoms or an alkylphenyl radical with an alkyl substituent containing from 8 to 12 carbon atoms, $x$ is the number of ethylene oxide units and is comprised between 2 and 6, and M is Na, K, $NH_4$, an amine group, or an alkanolamine group.

It has been found that the use of the above specified wetting agents during the suspension-polymerization step in the presence of hydroxyapatite results in suspensions which are stable even when the working conditions are varying. The polymeric compositions prepared by the process of this invention have the form of small beads, having a diameter varying from about 0.10 to 0.60 mm, and more particularly, between 0.12 and 0.45 mm.

As will be described hereinafter, several suspension stability tests have been carried out to determine the range of variation possible with the wetting agents of the present invention without loss of the relatively uniform small bead size of the high-impact vinyl aromatic polymers. Based upon these tests, it was determined that the amount of wetting agent may vary between wide limits; for example, stable suspensions are prepared when the amount of wetting agent is as low as about 20 ppm or, expressed in grams per liter of the suspension mixture, 0.02 grams per liter, and as high as about 2 g per liter. The more preferred amounts, however, have been discovered to be between about 0.025 g and 1.5 g per liter of the suspension mixture. Process conditions suitable for the production of small bead polymers are, of course, much easier to select, control, and vary, when such a broad range of wetting agent content is permissible. Although many different wetting agents are known for the suspension-polymerization technique, the degree of stability in the suspension step is higher with the type of wetting agents according to the general formula RO $(C_2H_4O)_x SO_3M$, as described herein, than with other wetting agents.

The influence of the type of wetting agent on the suspension stability is not yet well understood. In order to determine the most suitable wetting agents, a test method was used. This method consists in suspending styrene with hydroxyapatite, a wetting agent and water under stirring in a suspension reactor. After equilibrium conditions have been obtained, the agitator is stopped. Separation of the styrene droplets starts, and the time required to obtain a 10% separation is taken as a measure of the styrene droplet size. Good suspensions have small droplet size and, accordingly, separate slowly.

It has been found that by using wetting agents according to the present invention, the maximum separation time is much higher than with other wetting agents, and this maximum is often obtained with a lower amount of wetting agent. Moreover, separation times (generally higher than 1200 seconds) are obtained even when the amount of wetting agent varies between wide limits.

The above test method has been carried out with wetting agents of the present invention and have the general formula RO $(C_2H_4O)_x$ $SO_3M$. These wetting agents were compounds as follows:

Compound A: R is a mixture of alkyl radicals containing mainly 13 carbon atoms, $x$ is 2.2, and M is Na;
Compound B: same as Compound A, but $x$ is 6;
Compound C: same as Compound A, but with M=K;
Compound D: R is a mixture of alkyl radicals containing mainly 12 and 14 carbon atoms, $x$ is 2.5, and M is $NH_4$;
Compound E: same as Compound D, but M is a triethanolamine radical;
Compound F: R is an octylphenyl radical, $x$ is 2, and M is Na;
Compound G: R is a nonylphenyl radical, $x$ is 3, and M is a butylamine radical.

For each of these compounds, the maximum of suspension time and the amount of wetting agent which is required to obtain this maximum have been determined. The results of these experiments are given in Table I.

TABLE I

| Compound | Maximum of Separation (time in seconds) | Amount of Wetting Agent (g/l) |
|---|---|---|
| A | 2100 | 0.225 |
| B | 2100 | 0.30 |
| C | 2150 | 0.23 |
| D | 2250 | 0.20 |
| E | 2400 | 0.19 |
| F | 2370 | 0.20 |
| G | 2320 | 0.26 |

By way of comparison, other wetting agents which are not of the ethoxysulphate type have been used in the above described test, and the maximum of separation time is uniformly lower. For instance, this maximum is only 1500 seconds with the sodium salt of 2-ethylhexylsulphate.

Moreover, the test has shown that suitable separation times (which are higher than 1200 seconds) can be obtained with wetting agents according to the present invention, even when the amount of wetting agent is varied between wide limits. For instance, these limits are respectively:
Compound A: 0.07–0.39 g/l
Compound F: 0.09–0.31 g/l
these amounts being in grams per liter of water present in the system. By way of comparison, the corresponding values for the sodium salt of 2-ethylhexylsulphate are 4.5 ±30% grams per liter.

Other experiments have shown that stable suspensions are obtained by using as wetting agents alkaline, ammonium, amine, or alkanolamine salts of ethoxysulphates selected from the group consisting of (a) ethoxylated alkylsulphates containing from 2 to 6 ethoxyl groups, wherein the alkyl radical has 10 to 16 carbon atoms, and (b) ethoxylated alkylphenyl sulphates containing from 2 to 6 ethoxyl groups, wherein the alkyl substituent has 8 to 12 carbon atoms. The amine salts contain an alkyl amine group containing 1 to 4 carbon atoms. The alkanolamine salts contain an alkanolamine group containing 6 to 9 carbon atoms, total, e.g., more than one alkanol substituent having between 1 and 4 carbon atoms, such as, triethanolamine.

DETAILED DESCRIPTION OF THE PREFERRED EMBODIMENTS

Largely because of the overall versitility of high-impact vinyl aromatic polymers, many different kinds of monomers, suspending agents, wetting agents, catalysts, chain transfer agents, and the like are commercially available. Accordingly, the preferred individual ingredients, components, and agents specified hereinafter for the improved process of this invention are commercially available.

By the term "vinyl aromatic" there is meant a compound containing an alkenyl group attached directly to an aromatic nucleus. Such vinyl aromatic compounds are, for instance, styrene, alpha-methylstyrene, vinylnaphthaline, and the like. Optimum results are usually obtained when styrene is used, either alone or in admixture with a minor amount of another vinyl aromatic compound. By the term "rubber" is meant a polymer of butadiene or isoprene or a copolymer of butadiene and/or isoprene with styrene, acrylic acid ester, or other copolymerizable compound.

Along with the many advantages obtained by using the ethoxysulphate wetting agents, as set forth herein, an additional advantage is that a wide selection of wetting agents is possible according to the formula RO $(C_2H_4O)_x$ $SO_3M$. These wetting agents are easily available and are generally sold under the form of aqueous solutions having a concentration of active material varying between about 30 and 40% by weight. In the results of the above described experiments, the amounts of wetting agents are based on the active material. Moreover, the technical grades of these wetting agents are generally a mixture of compounds. For instance, the (ethoxylauryl) sulphate is an ethoxysulphate prepared from technical lauryl alcohol, containing mainly $C_{12}$ alcohols with lower amounts of $C_{10}$, $C_{14}$ and $C_{16}$ alcohols.

Specific examples of suitable wetting agents are the sodium salts and the alkanolamine salts of ethoxy-sulphates prepared from aluryl alcohol, myristyle alcohol, palmityl alcohols, synthetic branched alcohols containing mainly $C_{13}$ alcohol, octylphenol, nonylphenol, and dodecylphenol. The sodium salts of ethoxysulphates having an average of 2 to 3 ethoxyl groups and prepared from fatty alcohols containing from 10 to 16 carbon atoms or from alkylphenols, where the alkyl substituent has 8 to 12 carbon atoms are preferably used.

The main feature of the invention is the use of an ethoxysulphate during the suspension step. The technical products generally have an average of 2 to 3 ethoxyl groups. Similar products containing up to 6 ethoxyl groups or even more could be used, but without improvement of the results.

Polymerization of the monomer used in the invention is conducted in two steps, the first being carried out in bulk. About 2 to 30 parts of rubber are used per 100 parts by weight of aromatic monomer. The pre-polymerization may be thermally initiated by heating the polymerization mixture to the temperature of generally between 80° and 120° C. Moreover, a transfer agent or molecular weight modifying agent, more generally a mercaptan, is added to the polymerization mixture. Generally, this first stage of the polymerization is terminated after 20 to 40% of the monomer has been converted to polymer.

A suspension of the first step polymerization mixture is then prepared by adding water, hydroxyapatite, and a wetting agent, as hereinabove described. Hydroxyapatite is suitably prepared in situ from solutions of trisodiumphosphate and calcium chloride. Other conventional ingredients, such as mineral oils and fatty acids may also be added. Furthermore, it is necessary to add a polymerization catalyst, more particularly when the first step is a thermal polymerization. Reaction conditions for the suspension polymerization are conventional, the main characteristic being the use of hydroxyapatite as suspending agent and of one of the above specified wetting agents to improve suspension stability.

The hereinabove described tests, relating to the separation time, have shown that the amount of wetting agent may vary between wide limits. It results that in practical use, stable suspensions and small beads are prepared when the amount of wetting agent is varying between about 0.020(20 ppm) to 2g, and more particularly between about 0.025(25 ppm) to 1.5g per liter of suspension mixture, the small beads being the recovered polymer product.

The invention is further illustrated by the following examples. Unless otherwise stated, all quantities are expressed in terms of parts by weight.

EXAMPLE 1

A dissolving tank was charged with 3500g of styrene, 428.4g of rubber SOLPRENE 235 (Registered Trademark of Phillips Petroleum Co.) and 120g of water. The mixture was stirred for 12 hours at 20° C. and at 70 rpm. To this mixture were then added dodecylmercaptan (0.16%) as transfer agent and benzoyl peroxide (0.05%) as polymerization catalyst.

The mixture was charged into a polymerization reactor and was heated for 5½ hours at 95° C., under stirring at 225 rpm. The viscosity of the mixture after this first polymerization step was 21,000 centipoises.

A suspending mixture was prepared at 65° C. from 856 g water, 32.21g trisodium phosphate, 42.12g calcium chloride, and 2.32g calcium hydroxide.

The polymerization mixture and the suspending mixture were introduced into a second polymerization reactor which was also charged with 1,607g water, and 2.5g tert. butyl perbenzoate as catalyst, and 0.2g of the sodium salt of an ethoxysulphate containing an average of 2.2 ethoxyl groups and prepared from a mixture of synthetic alcohols containing mainly $C_{13}$ and $C_{15}$ alcohols. This mixture was heated for 5 hours at 112° C., after which 0.66g dicumyl peroxide and 0.4g calcium hydroxide were added, and the mixture was further heated at 132° C. for 1 hour.

A suspension was easily obtained. The reaction product consisted of small uniform spherical beads of high-impact polystyrene. The granulometry of said product was:

| Mesh | % by Weight |
|---|---|
| 25 | 0.8 |
| 35 | 2.59 |
| 45 | 16.75 |
| 60 | 29.11 |
| 80 | 29.71 |
| 120 | 13.76 |

-continued

| Mesh | % by Weight |
|---|---|
| 120 | 7.28 |

About 80% of the beads had a diameter between 0.16 and 0.6 mm.

By way of comparison, other experiments were carried out under the same conditions but with the use of the following wetting agents:
sodium salt of ethylhexyl sulphate;
sodium salt of 3-ethyl-9-ethyl-decylsulphate;
sodium salt of dodecylbenzenesulfonate
sodium salt of (ethoxylated nonylphenol) phosphate containing 3 ethoxyl groups.

Another experiment has been carried out with the sodium salt of dodecylbenzenesulfonate and in the presence of a further suspending agent, polyvinylpyrrolidone. A suspension could not be prepared. By using a higher amount of hydroxyapatite, the suspension obtained was broken after 1 hour.

EXAMPLE 2

The procedure of Example 1 was repeated, but with the use of the sodium salt of (ethoxylated nonylphenol) sulphate containing an average of 3 ethoxyl groups.

The granulometry of the polymer beads was as follows:

| Mesh | % by Weight |
|---|---|
| 20 | 6.24 |
| 30 | 18.0 |
| 40 | 36.0 |
| 60 | 31.0 |
| 80 | 7.0 |
| 100 | 1.5 |
| 100 | 0.3 |

More than 90% of the beads had a diameter of between about 0.15 to 0.6 mm.

EXAMPLE 3

A tank was charged with 144 kg of styrene, 9.85 kg of rubber SOLPRENE 201 (Registered Trademark of Phillips Petroleum Co.), and 5 kg water. The mixture was stirred for 12 hours at 20° C. and at 120 rpm. To this mixture was then added 121g of tert.-dodecylmercaptan as transfer agent.

The mixture was charged into a polymerization autoclave and was heated at 115° C. for 3½ hours, under stirring. The viscosity of the mixture after this first mass thermal polymerization step was 2,600 centipoises.

A suspending mixture was prepared at 66° C. from 41.5 kg water, 395g trisodium phosphate, 500 g calcium chloride, and 4g calcium hydroxide.

The polymerization mixture and the suspending mixture were introduced into a second polymerization reactor which was charged with 83 kg water, 183 g tert. butylperbenzoate as initiator, 5.3g of the sodium salt of the ethoxysulphate containing an average of 2.2 ethoxyl groups and prepared from a mixture of synthetic fatty alcohols containing mainly $C_{13}$ and $C_{15}$ alcohols. This mixture was heated for 5 hours at 110° C., under stirring at 120 rpm. Dicumyl peroxide in the amount of 125g and 33g calcium hydroxide were then added, and the mixture was further heated at 135° C. for 2 hours, under stirring at 120 rpm.

The reaction product consisted of small uniform spherical beads of high-impact polystyrene. The granulometry of the product was:

| Mesh | % by Weight |
|------|-------------|
| 16   | 12.0        |
| 20   | 39.0        |
| 30   | 19.0        |
| 40   | 23.0        |
| 60   | 5.0         |
| 80   | 1.5         |
| 100  | 0.5         |

About 98% of the beads had a diameter of between about 0.12 and 0.45 mm. These beads were easily worked and molded.

We claim:
1. A process for preparing high-impact vinyl aromatic polymers comprising:
   a. mass pre-polymerizing vinyl aromatic hydrocarbon in the presence of from about 2 to 30%, based upon the weight of said monomer, diene rubber, said prepolymerization being continued until about 5 to 40% of said monomer is polymerized to provide a pre-polymerization product, and
   b. suspension polymerizing said pre-polymerization product in the presence of hydroxyapatite and of at least one ethoxysulphate of the formula $RO(C_2H_4O)_x SO_3M$, wherein R is selected from the group consisting of alkyl radicals having from 10 to 16 carbon atoms and alkylphenyl radicals having an alkyl substituent of from 8 to 12 carbon atoms, $x$ is between 2 and 6, and M is selected from the group consisting of Na, K, N, $NH_4$, an amine group, and of an alkanolamine group.

2. The process according to claim 1, wherein said ethoxysulphate is present in an amount of from about 0.02g to 2g per liter of suspension mixture.

3. The process according to claim 1, wherein said ethoxysulphate is used in an amount of between 0.025 and 1.5 grams per liter of suspension mixture.

4. The process according to claim 1, wherein said ethoxysulphate is the ethoxysulphate of a mixture containing predominantly aliphatic alcohols of 12 and 14 carbon atoms.

5. The process according to claim 1, wherein the ethoxysulphate is the ethoxysulphate of a mixture containing predominantly aliphatic alcohols of 13 and 15 carbon atoms.

6. The process according to claim 1, wherein between about 20 and 40% of said monomer is polymerized in step (a), M is sodium (Na), R is selected from the group consisting of alkyl radicals having from 10 to 16 carbon atoms, and alkylphenyl radicals having an alkyl substituent of from 8 to 12 carbon atoms, and $x$ is between 2 and 3.

7. The process according to claim 6, wherein the ethoxysulphate is present in an amount of from about 0.020g to 2g per liter of suspension mixture.

8. The process according to claim 6, wherein the ethoxysulphate is present in an amount of between about 0.025g and 1.5g per liter of suspension mixture.

9. The process according to claim 6, wherein said ethoxysulphate is the ethoxysulphate of a mixture containing predominantly aliphatic alcohols of 12 and 14 carbon atoms.

10. The process according to claim 6 wherein the ethoxysulphate is the ethoxysulphate of a mixture containing predominantly aliphatic alcohols of 13 and 15 carbon atoms.

* * * * *